United States Patent Office 3,338,088
Patented Aug. 29, 1967

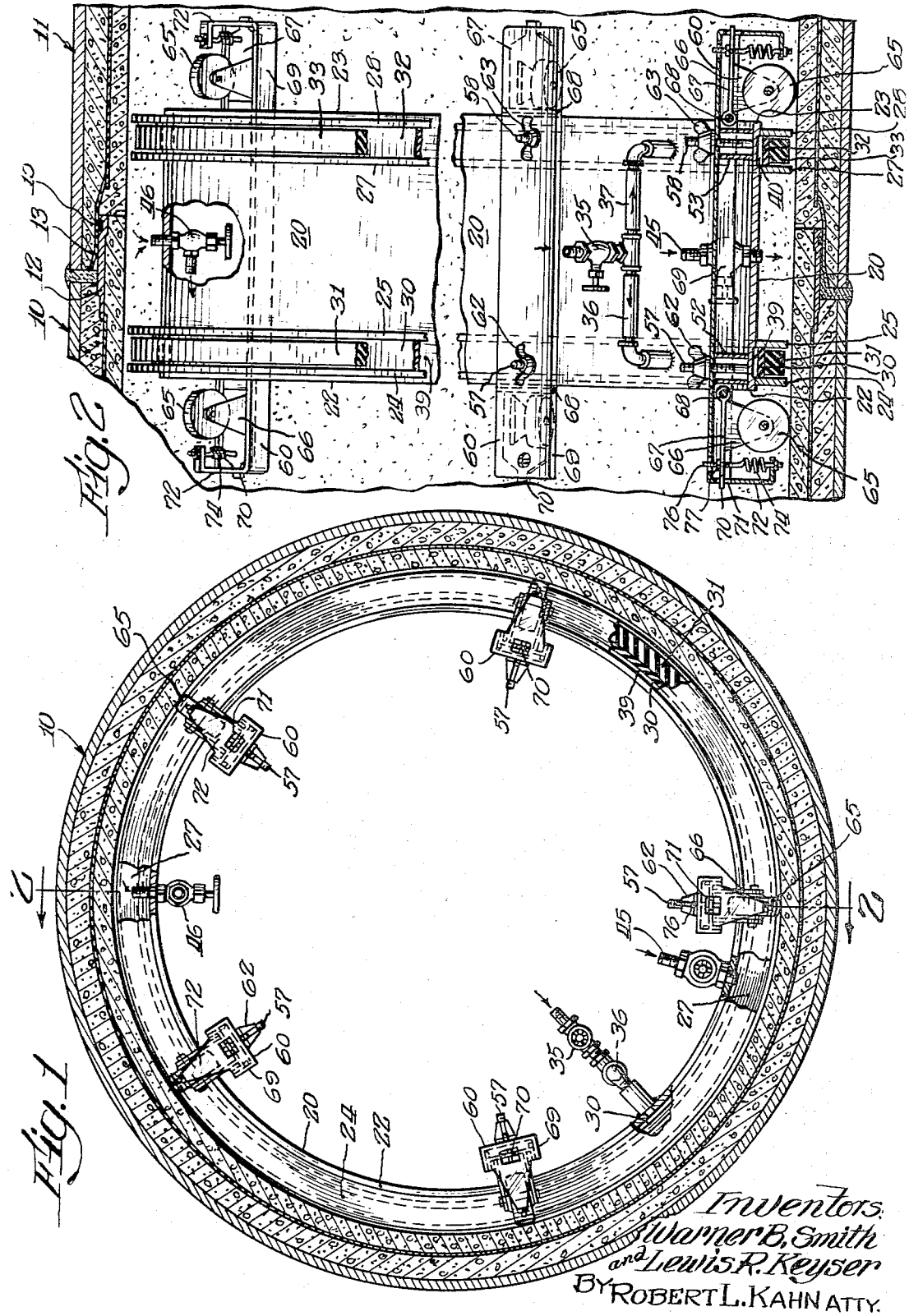

3,338,088
MEANS FOR TESTING JOINTS FOR LARGE
DIAMETER PIPE
Warner B. Smith and Lewis R. Keyser, Dayton, Ohio, assignors to Price Brothers Company, Inc., Dayton, Ohio, a corporation of Michigan
Filed Oct. 18, 1965, Ser. No. 496,842
4 Claims. (Cl. 73—46)

ABSTRACT OF THE DISCLOSURE

A structure for testing for leaks in a short length of cylindrical pipe has means for applying fluid pressure in a narrow annular region at the interior of the pipe region being tested. The annular region is sealed by a gasket structure responsive to fluid pressure. The gasket structure has an inner sealing ring of soft material working against an outer ring of less compressible material. The two rings of material are disposed between annular rigid guide flanges. One region is sealed by the soft inner rings forced against the flanges. The testing region is sealed by the outer rings forced against the opposed inner surface of the pipe being tested. Means are provided for centering the testing device within pipe cylinder.

This invention relates to means for testing joints for large diameter pipe, the pipe in question having diameters of the order of from one foot and up. Pipes to which the invention is particularly applicable are of the type wherein telescoping pipe members are fitted together with gaskets therebetween for the purpose of providing watertight joints. While the invention may be applied to metal pipe having welded joints, its principal field of application is a pipe line wherein one or more gaskets are relied upon for sealing adjacent pipe members. In particular, pipes made of steel cylinder or concrete with or without steel reinforcement, can profitably utilize the invention hereinafter described.

While pipe lines above or below ground level can have their joints tested by the new tester, an important practical application is with reference to under water pipe lines. Pipe lines of this character have their individual pipe lengths assembled on the bottom of a body of water and under the control and direction of one or more divers to insure that the various pipe components are correctly fitted. The assembly is generally similar to conventional practice on land. See, for example, United States Patent No. 3,212,797 issued Oct. 19, 1965. It sometimes happens, however—and this is particularly true where bell and spigot pipe joints are involved—that one or more gaskets may have portions thereof mislaid or turned over out of proper position.

Thus, for example, a joint in a pipe line having a diameter of 5 feet may require a circumferential gasket having a length of the order of about 15 feet or 16 feet. It is only necessary to have one or two inches of such gasket rolled over or out of place when a spigot end of a pipe length is being inserted into the bell end of a previously laid pipe length to have a defective joint. Once various pipe lengths are assembled to form a submarine type of pipe line, then it becomes extremely expensive to repair a defective pipe joint. All such work must be done with divers and, in any instances, the water in which the work is being done is not clear so that the sense of touch rather than visibility must be relied upon.

Apparatus embodying the present invention may be disposed in pipe lengths and advanced forwardly as the pipe line progresses. The apparatus may be short enough along the length of a pipe so that it may be able to negotiate curves in the pipe line. While the apparatus embodying the present invention may be used to test annular elements of large diameter pipe for leaks, its greatest and most convenient application is in connection with the testing of joints between adjacent lengths of pipe.

One decided advantage of the new apparatus for large pipe resides in the fact that a minimum amount of air or water is needed in making the test and minimum time is required for each test. The actual testing consists of applying air or water from a pressure pump to an annular region at the joint. If there is a leak, the condition becomes evident by the inability of the pump to maintain pressure. In that case, the newly added pipe length can be pulled free and the joint examined to see that the gasket is correctly in position or to correct any other defect.

In general, an apparatus embodying the present invention has two annular gasket systems spaced longitudinally from each other along the pipe length and disposed within the interior of the pipe, usually on opposite sides of the pipe joint or region being tested. The new apparatus has means for providing an annular region inwardly spaced from the pipe interior surface which cooperates with the gasket systems to provide a sealed annular region which may be subjected to air or hydrostatic pressure for test purposes. The construction includes means, such as air or water pressure, for forcing the annular gasket systems against the pipe interior surface for sealing.

For an understanding of the invention reference will now be made to the drawing wherein FIG. 1 is an end view of an apparatus embodying the present invention disposed within a pipe including a joint in position for testing.

FIG. 2 is a partial section on line 2—2 of FIG. 1.

Numbers 10 and 11 are the adjacent ends of two lengths of pipe of any desired construction. As illustrated, one pipe length has a spigot structure generally indicated by 12 at one end and bell 13 at the other end. Suitable gasket means 15 between the bell and spigot of adjacent pipe lengths may be provided for sealing. Each length of pipe may have steel wire reinforcement circumferentially of the pipe and, if desired, may have longitudinal reinforcement, both being well known in the art. It is also possible to have each pipe length of the cylinder variety consisting of a steel cylinder usually reinforced by tensioned steel wire in the form of a helix and the inner and/or outer surfaces of the steel covered with concrete. The joint need not necessarily have cooperating bell and spigot ends. Inasmuch as the invention is not concerned with the pipe structure or with the joint between adjacent pipe lengths, no further description is considered necessary.

As previously pointed out, the pipe is generally, though not always, of large diameter when used for water lines sewers and the like and may have an inside diameter about six feet or more though the invention is useful for smaller pipe. The only significance of the pipe diameter resides in the fact that the test apparatus must be dimensioned for a particular pipe size.

Insofar as pipe lengths are concerned, they are generally manufactured in desired lengths up to about 16 or 20 feet. The actual length of a piece of pipe is of no importance insofar as the present invention is concerned.

The testing apparatus itself includes cylinder 20 of steel or other suitably strong, rigid material. The thickness of the wall of cylinder 20 will depend upon the amount of pressure to be handled. In general, cylinder 20 may have a wall thickness up to about one-half inch so that substantial pressures of the order of several hundred pounds per square inch may be handled if desired. Due to the shape of cylinder 20, the fluid (air or water) pressure against the outer surface (this is the surface opposed to the inside surface of the pipe) will be most effectively resisted. Cylinder 20 has an outside diameter which is substantially less than the inside diameter of the pipe being tested, the difference in diameter being great enough to accommodate the remaining structure to be described. As a rule, the wall of cylinder 20 will, for large size pipe, be spaced from the opposed inside surface of the pipe by a distance of the order of about 2 or 3 inches. For smaller size pipe, the spacing may be reduced.

Cylinder 20 has a length along the axis of the pipe which should be great enough so that the cylinder can be opposite the joint and engage the inside surfaces of the adjacent pipe lengths. As a rule, the length of cylinder 20 may be of the order of between 1 and 2 feet although the exact length in itself is not important. Too long a length for cylinder 20 in comparison to the inside diameter of a joint being tested may prevent the test apparatus from following curves in a pipe line. It must be understood that the test apparatus can be conveniently pushed forwardly along a pipe length to test each joint in succession as pipe lengths are added.

Cylinder 20 has end portions 22 and 23. Adjacent end portion 22, cylinder 20 has rigidly attached thereto, as by welding, outwardly extending spaced parallel rigid guide rings 24 and 25. Guide rings 24 and 25 have widths (this is the dimension radially of the cylinder) less than the normal spacing between the outer wall of cylinder 20 and the inside surface of the pipes being tested. In the specific example whose dimensions are being given here, the width of guide rings 24 and 25 may be about 2½ inches. The spacing between adjacent guide rings 24 and 25 may be of the order of about 2 inches. Preferably the outer guide ring, in this instance 24, has a thickness greater than inner guide ring 25 since guide ring 24, in general, must withstand a greater lateral force. Guide ring 25 is subject to generally equal pressures on both sides of the wall and thus can be thinner.

The clearance between the outer edges of the guide rings and the inside surface of the pipe being tested should, when the apparatus is properly centered in the pipe, be of the order of between ½ and 1 inch for large size pipe. Such a clearance is necessary because such pipes are frequently out of round. The clearance will also permit the apparatus to negotiate curves in the pipe line. End portion 23 of cylinder 20 is similarly provided with guide rings 27 and 28. In this case, guide ring 28 is the outer ring and can be thicker than the inner ring 27.

Referring to the pair of guide rings 24 and 25, there is disposed between them a gasket system consisting of inner annular ring 30 and outer annular ring 31. Inner ring 30 is of highly elastic compressible gasket material such as gum rubber or plastic. Inner ring 30 has a thickness radially of the cylinder which is substantially less than the thickness of outer ring 31. As an example, inner gasket ring 30 may have a thickness of between about ¼ inch and about ½ inch and is wide enough (this is the dimension along the length of the cylinder) so that the inner ring 30 is normally tight against the opposing inner walls of guide rings 24 and 25. The function of inner annular ring 30 is to provide a fluid tight seal between the wall of cylinder end 22 on the one hand and adjacent outer annular ring 31. As an example, ring 30 may have a durometer hardness of about 30. In comparison to this, outer annular ring 31 is of dense elastic rubber or similar material having a hardness substantially greater than that of the inner ring and, as an example, may have a hardness of about 60. The width (along the length of cylinder 20) of outer gasket ring 31 is somewhat less than the spacing between the opposed surfaces of gasket rings 22 and 23 while the thickness of outer gasket ring 31 is substantially greater than that of gasket 30. Thus, the normal thickness of outer ring 31 can be between two and four times the normal thickness of inner gasket ring 30.

The thickness of outer gasket ring 31 will depend in some measure upon the clearance between the outer edges of the guide rings and the inside surface of the test pipe. It is important that a substantial portion of outer gasket ring 31 should always lie between the guide rings even when the outer gasket ring is forced radially outwardly to engage the opposed inner surface of the pipe. It will be understood that outer gasket ring 31 must establish a fluid-tight seal against the opposed face of the pipe to withstand the pressure of the air or water being used for test purposes.

As will be explained later, fluid under pressure is utilized to stretch the gasket system circumferentially and force outer gasket ring 31 to establish a fluid-tight seal against fluid under pressure between guide rings 25 and 27 on the one hand and the region within the pipe but beyond rings 24 and 28. It is understood that the gasket material for outer gasket ring 31 can stretch sufficiently under force to expand circumferentially. It is desirable that the clearance between the side faces of outer gasket ring 31 and the opposed side faces of guide rings 24 and 25 but sufficient so that the normal tendency of gasket material 31 to contract upon release of water pressure be substantially unimpeded. This retraction is augmented by causing a vacuum in annular space 39 as described later.

Guide rings 27 and 28 are similarly provided with a gasket system consisting of inner annular gasket ring 32 and outer gasket ring 33. The nature of the materials for these two gasket rings and the general construction is the same as described before in connection with gasket rings 30 and 31.

To subject the gasket systems to fluid pressure for circumferential expansion of the same into sealing engagement with the inside surface of the test pipe, fluid supply pipe 35 is provided. Pipe 35 is connected to pipe branches 36 and 37 secured to and passing through annular portions 39 and 40 of cylinder 20. Annular portion 39 lies between guide rings 24 and 25 while annular portion 40 is the corresponding part of cylinder 20 between guide rings 27 and 28. To provide ready access of fluid circumferentially under gaskets 30 and 32, annular portions 39 and 40 are undercut opposite these gaskets.

The application of fluid under suitable pressure from supply pipe 35 will cause inner gasket rings 30 and 32 to expand radially and outwardly. These inner gasket rings will tend to form a tight seal against the side walls of the guide rings. This seal action will be aided by the fact that the gasket rings 30 and 32 are substantially softer than gasket rings 31 and 33. Thus, gasket rings 30 and 32 will be compressed and will spread to establish tight seals against the guide rings. As gasket rings 30 and 32 expand outwardly, the pressure is communicated to gasket rings 31 and 33 to expand these outwardly until these gasket rings 31 and 33 seat against the opposed inner surfaces of the test pipes.

The stretching and compression on gasket rings 31 and 33 when forced against the inner surfaces of the pipe (whether concrete or steel) develops substantial friction between the gasket material and pipe surface to anchor the same against yielding laterally (along the pipe length) and prevents the gasket material from escaping through the annular gap between the inside pipe surface and edges of guide rings 24, 25, 27 and 28.

Fluid supply pipe 45 extending through cylinder wall 20 is used to provide fluid path in the test chamber between cylinder wall 20 and the inside of the test pipe and between the gasket seals. It is understood that the test apparatus can use either air or water as the test fluid medium. When the apparatus is used for testing pipe located below the surface of water, the test fluid is preferably air. In the event that there is a leak, air bubbles will pass from the test chamber through to the water outside. Air will also be used for expanding the gaskets in sealing position although water may be used.

For testing pipe located on ground rather than under water, the fluid is preferably water. In such case it is desirable to provide air purge valve 46 which extends through the wall of cylinder 20 well up into the test chamber. Purge valve 46 must be at the top of the test chamber. This can be controlled by visual observation to insure that the testing apparatus does not change its orientation while being moved from one location to another or if it does, then the apparatus should be properly oriented.

The joint being tested, if leaky, would force air within the test chamber out, particularly if the leak is near the top of the pipe. However, depending upon this is not desirable for the reason that it may take time for air to be purged in this fashion and wait for water to leak through for indicating a leak. Opening valve 45 will quickly result in purging air and speed the testing process.

When a test is to be initiated, fluid from supply valve 35 is initially provided for moving the gasket systems into sealing engagement with the pipe surfaces. Thereafter fluid from supply valve 45 can be fed into the test chamber. It is understood that the fluid from both valves will be under suitable pressure for testing for leaks. In the event that the fluid is air for under water testing, it will not be necessary to use purge valve 46. If the fluid is water, generally useful for testing pipe on ground, then purge valve 46 will be used. It is understood that this valve should be at the top of the test chamber. After purge valve 46 is closed, the test can be conducted.

At the termination of the test, fluid can be exhausted through valve 45 and then valve 35 by connection to the intake of a fluid pump. This will retract gaskets 30 and 32 and will permit gaskets 31 and 33 to contract.

It is also possible to maintain the gasket systems in sealing engagement by keeping fluid pressure on the gasket system through valve 35 and exhaust the annular test chamber for testing infiltration from the exterior of the pipe through a joint or the like to the interior of the pipe.

The testing apparatus is provided with suitable support means which are adapted to center the apparatus within a test pipe. In pulling or moving the testing apparatus along from one joint to another joint within a pipe, it is not only necessary for the entire apparatus to adapt itself to unevenness within the pipe but also there may be a tendency for the entire test apparatus to gradually turn about its axis. This latter effect would change the orientation of the test apparatus and is more likely to occur in underwater pipe lines. This is due to the fact that divers may have difficulty in controlling the orientation of the test apparatus. Since air would be used as the fluid medium under such conditions, the position of purge valve 46 would not be important. However, it is desirable that the test apparatus be capable of generally centering itself within the pipe. To accomplish this, a number of adjustable spring loaded casters or wheels are provided at spaced intervals around the circumference of the test apparatus. Since every one of these spring loaded casters and mountings are similar, only one need be described in detail. In general, the spring loading should be strong enough for centering but should not interfere with the gasket sealing action.

Welded to the inner surfaces of cylinder portions 22 and 23 are steel spacer sleeves 52 and 53. Sleeves 52 and 53 have hold-down bolts 57 and 58 extending inwardly toward the center of the test apparatus and welded to cylinder 20. Steel support channel 60 extends generally parallel to the axis of cylinder 20 and laterally offset from the wall thereof. Support channel 60 has a length sufficiently great so that the ends thereof project beyond the ends of cylinder 20.

Support channel 60 is clamped down against the ends of sleeves 52 and 53 by hold-down bolts 57 and 58 passing through suitable apertures in said strip with wing nuts 62 and 63 threaded on the hold-down bolts to firmly retain support channel 60 in position. Each projecting end portion of support channel 60 carries a spring loaded caster. This spring loaded caster has wheel 65 supported for rotation between bracket plates 66 extending from auxiliary support member 67. Auxiliary member 67 is pivoted on pin 68 supported from sides 69 of channel 60 so that auxiliary support member 67 may rock toward and away from the inside surfaces of the concrete pipes. Auxiliary support member 67 has end portion 70 extending through slot 71 in downwardly extending channel extension 72. Thus, auxiliary support member 67 can rock about pivot pin 68 over a limited angle.

The spring loading is provided by coil spring 74 extending between the bottom end of extension 72 on the one hand and threaded straight portion 76 passing through an aperture in auxiliary support member 67. Nut 77 for threaded portion 76 bears against the top face of auxiliary support member 67. Turning nut 77 adjusts by controlling the tension of spring 74 to provide a general centering action for the test apparatus while the gasket systems are inoperative. Preferably there is enough lost motion in the entire mounting to permit each caster wheel 65 to accommodate to the pipe surface.

What is claimed is:

1. Apparatus for testing for leaks in a short length of large diameter pipe line, said appartus comprising a short rigid metal cylinder having an outer diameter less than the inner diameter of the pipe being tested, a pair of laterally spaced rigid metal guide flanges secured to the exterior of said short cylinder adjacent one end thereof and extending radially outwardly therefrom and having a diameter less than that of the inner diameter of the pipe, a similar pair of guide flanges disposed adjacent the other end of said short cylinder, a gasket system for each pair of guide flanges, each gasket system being disposed between each of the guide flanges making up a pair, each gasket system having a thin inner compression ring about which is disposed a thick outer compression ring, the inner ring having a normal width at least as great as the flange separation and being of soft, readily compressible, flexible material, the outer ring being massive in comparison to the inner ring and normally having a uniform width somewhat less than the flange separation for clearance and having a thickness which is substantially greater than that of the inner ring, said outer ring being solid and having at least most of the outer ring between guide flanges at all times, the outer ring material being deformable, elastic and substantially more dense than the inner ring material, means for supplying fluid under pressure into the annular region under the inner ring of each gasket system to force the inner gasket ring into sealing engagement with metal and exert pressure against the adjacent inner surface of the outer gasket ring, the fluid pressure being sufficiently great to expand the outer ring in each gasket system so that the outer surface of each outer ring is forced against the opposed inner surface of the pipe, the only unconfined area in the entire gasket system being a narrow annular area at the flange edge along each side of the outer ring, said solid dense outer ring, when expanded, absorbing all the work performed by the fluid pressure and storing sufficient energy to provide powerful retraction back to normal shape upon release of said fluid pressure and means independent of the first named fluid means for conducting test fluid into or from the annular test chamber lying between the exterior surface of the short cylinder and opposed inner surface of the pipe, said gasket system providing for minimum volume of gasket operating fluid and simple gasket construction.

2. The structure according to claim 1 wherein the short rigid cylinder has an annular shoulder immediately adjacent each flange only at the gasket side of each flange thereby providing an annular region underneath the inner ring, said gasket expanding fluid supply means introducing fluid to said annular region between shoulders.

3. The structure according to claim 2 wherein said inner ring of gasket material is of rubber having a durometer hardness of about 30 and the outer ring of gasket material is of rubber having a durometer hardness of about 60.

4. The construction according to claim 1 wherein centering means are provided, said centering means comprising spring loaded casters disposed at circumferentially spaced intervals on said short cylinder, means for mounting said casters on said short cylinder so that said casters can project toward and engage the opposed pipe surface, the spring loading being sufficient to center the apparatus but permitting the outer gasket rings to engage the opposed cylinder wall during testing.

References Cited

UNITED STATES PATENTS

| | | | |
|---|---|---|---|
| 1,931,502 | 10/1933 | Markle et al. | 73—46 |
| 2,481,013 | 9/1949 | Henderson. | |
| 2,927,456 | 3/1960 | Russell | 73—46 |
| 3,000,205 | 9/1961 | Suderow | 73—46 |

LOUIS R. PRINCE, *Primary Examiner.*

J. NOLTON, *Assistant Examiner.*